United States Patent [19]

Girodi et al.

[11] Patent Number: 4,500,764
[45] Date of Patent: Feb. 19, 1985

[54] DEVICE FOR INTERNAL WELDING OF PIPES OR THE LIKE

[75] Inventors: Erich Girodi; Günter Bornowski; Eberhard Dejmek, all of Hoyerswerda; Andreas Knabe, Bernsdorf; Roland Koch, Weisswasser; Bernd Urbach, Mühlhausen; Arnold Weisselberg, Halle, all of German Democratic Rep.

[73] Assignee: VEB Gaskombinat Schwarze Pumpe, Schwarze Pumpe, German Democratic Rep.

[21] Appl. No.: 521,734

[22] Filed: Aug. 9, 1983

[30] Foreign Application Priority Data

Nov. 4, 1982 [DD] German Democratic Rep. ... 244551

[51] Int. Cl.³ .................. B23K 37/02; B23K 31/06
[52] U.S. Cl. .................. 219/59.1; 219/60 R; 219/66; 219/61.1
[58] Field of Search .............. 219/60 R, 61.1, 66, 219/59.1, 60 A

[56] References Cited

U.S. PATENT DOCUMENTS 4,081,651  3/1978  Randolph et al. ............ 219/66 X
4,238,659  12/1980 Koshiga et al. .............. 219/61

FOREIGN PATENT DOCUMENTS 0071357  6/1977  Japan .................. 219/60 R

Primary Examiner—Roy N. Envall, Jr.
Assistant Examiner—C. M. Sigda
Attorney, Agent, or Firm—Michael J. Striker

[57] ABSTRACT

Apparatus for internal welding of pipes is provided with an external mechanism for rotating a pipe to be treated and a car insertable into the pipe and operable within the pipe. The car which carries a welding equipment is rigidly mounted to a central shaft which is freely pivotally mounted by means of bearings in two subframes each of which carries a number of tread rollers which can be locked against the inner surface of the pipe, so that the subframes during the operation are rotated together with the pipe whereas the car hangs downwardly within the pipe.

10 Claims, 2 Drawing Figures

DEVICE FOR INTERNAL WELDING OF PIPES OR THE LIKE

BACKGROUND OF THE INVENTION

The present invention relates to apparatus for internal welding of pipes or like objects in general, and in particular to a device for producing circumferential internal welding seams in pipes of greater diameters and length.

There are known apparatus for producing internal welding seams in the pipes which are rotated about their central axes. The pipes to be treated are normally placed on a rotating mechanism and the circumferential seam welding is performed on those pipes by the welding equipment. The welding apparatus itself is held in the stationary position while the pipes are turned about their axes by the rotating mechanism. The welding is carried out from outside of the pipe and therefore the welding apparatus can be easily held in the stationary position or moved longitudinally of the pipe. However, in many instances a welding exclusively from outside of the pipe is not possible and an additional welding from inside of the pipe is required. Moreover, for long pipes such as used for long-distance pipelines, it has been difficult to get to the point to be welded with a suitable automatic welding equipment.

The internal welding of pipes is disclosed, for example in U.S. Pat. No. 4,238,659. In the reference method the welding torches are mounted at the free end of a boom which is laterally moved into the pipe to be welded. The boom is moveable by a carriage so that the end of the boom carrying the welding torches is inserted into the pipes to be welded. The boom is mounted to the carriage so that it can be adjusted in height.

The disadvantage of this otherwise satisfactory apparatus is that vibrations may occur during the operation of the welding equipment on relatively long pipes due to the length of the boom which must be sufficient to move the welding torches to the necessary point, these vibrations can cause difficulties for a regular welding. Furthermore, there are restrictions in a possible length of the boom since it can not be extremely long.

A device for internal welding is also disclosed in USSR Inventors' Certificate No. 735,389 which describes an internal welding installation mounted within the pipe being treated. A circumferential weld is carried out by means of a welding equipment driven by a special drive. During this process the welding equipment is rotated about the central axis of the pipe whereas the pipe to be welded is stationary. The disadvantage of this design is that the welding position is constantly changing during the process of circumferential welding. This has negative effects on the quality of the weld being produced. Moreover, all known welding methods especially submerged-arc welding which is used very often due to its efficiency cannot be utilized with this known device.

SUMMARY OF THE INVENTION

It is an object of the present invention to provide an improved device for internal welding of pipes.

It is a further object of the invention to provide an efficient device for internal welding of pipes of greater diameters and lengths.

It is still a further object of the invention to reduce a welding time as compared to conventional devices of the foregoing type.

It is still another object of the invention to provide a device in which highly productive welding method, for example a submerged-arc welding method, can be utilized.

A preferred field of the application of the device according to the invention is welding of pipes for the building of long-distance pipelines. However, it is also possible to use the device of the invention for welding of usual joints of pipes and tanks in workshops.

The above and other objects of the invention are attained by a device for internal welding of elongated objects, such as pipes, tanks or the like, particularly pipes of greater diameters and lengths, comprising means for rotating an object being treated about a central axis thereof, a car carrying a welding equipment and positioned within an object to be treated, at least two subframes spaced from each other in the direction of elongation of said object and each carrying a plurality of tread rollers, said subframes being positioned within said object, said tread rollers being provided with locking means adapted to lock said tread rollers against an inner surface of said object, and at least one shaft arranged to be positioned along the central axis of the object and pivotally mounted in said subframes, said shaft being rigidly connected to said frame so that upon rotation of said object about the central axis thereof said car is able to pivot freely about the central axis of the object and is permanently hung downwardly by its own weight whereby a complete welding of an internal circumferential seam of said object is produced upon a complete rotation of the object by said rotating means.

The rotating means may be positioned outside to object to be welded.

Each of the subframes may carry at least three tread rollers.

Each of the subframes may include three elongated struts each terminated with the respective tread roller, said struts being circumferentially spaced from each other at 120°.

Each of the sub-frames may further include a bearing to which said three struts are rigidly connected, said shaft being pivotally mounted in the bearings of said subframes.

Each of the struts may be provided with an adjustable means for adjusting the length of said strut and thus the distance of the respective roller from said shaft to the inner surface of the object to be welded.

The locking means of each tread roller may include a nut rigidly connected to the respective strut and a locking bolt adjustably mounted in said nut and adapted to rest against the inner surface of said object.

The subframes may be moveable along the elongation of the object to be welded.

The car may be movable along the elongation of the object to be welded.

Furthermore, the car may be provided with a transverse rod projecting outwardly from the object within which said car is positioned, and with a support, said transverse rod being supported on the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
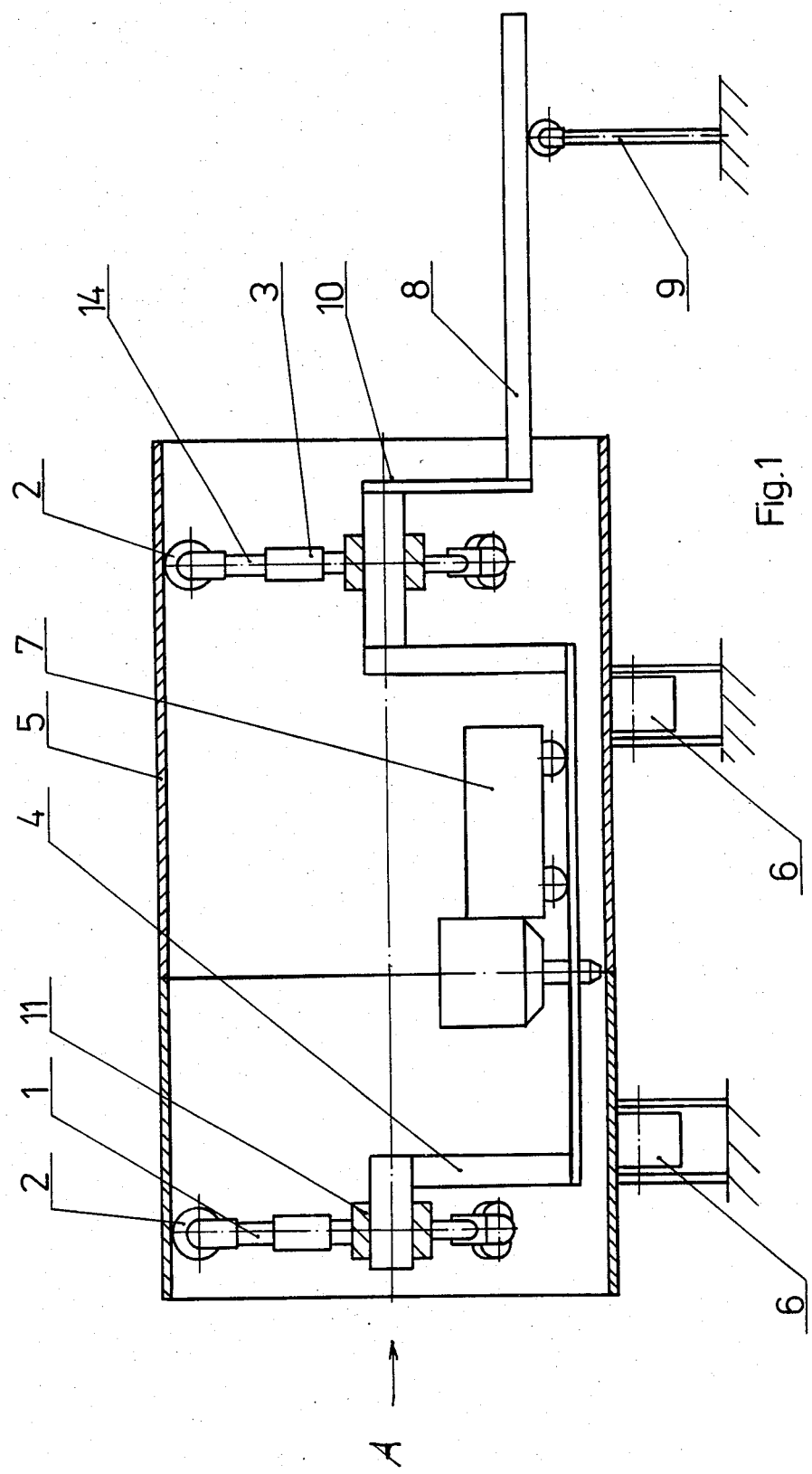
FIG. 1 is a schematic side view partially in section, of the apparatus for internal welding of pipes according to the invention.
Figure 2:
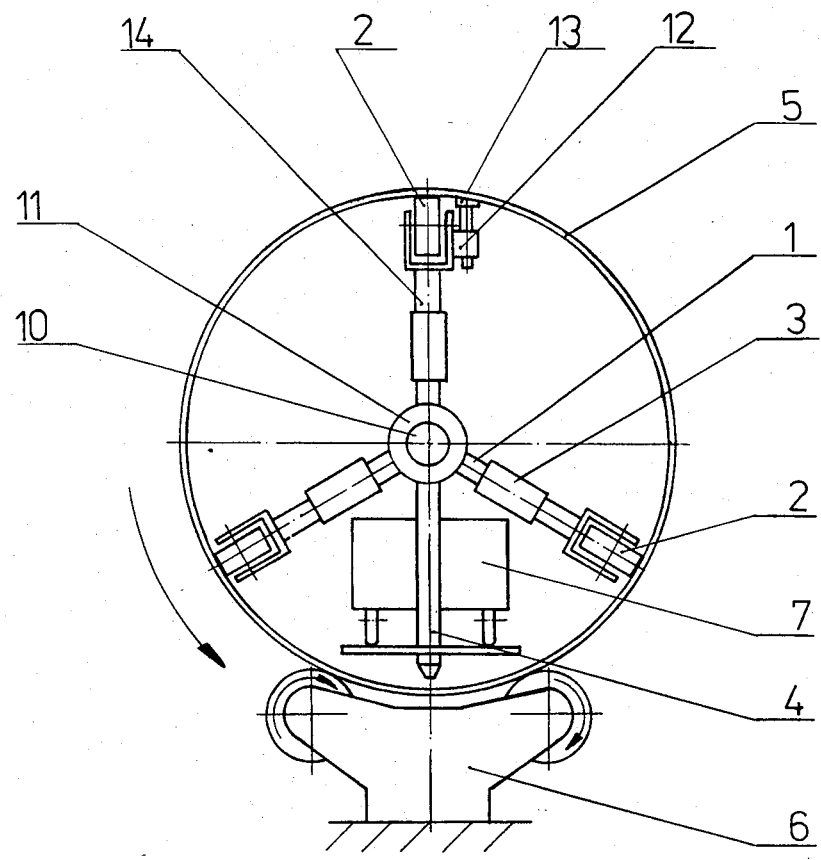
FIG. 2 is a sectional view from arrow A of FIG. 1.

With reference to FIGS. 1 and 2 it is seen that apparatus for internal welding of pipes is installed within a pipe 5 to be treated. The apparatus is comprised of two subframes 1 spaced from each other in the axial direction of the pipe and mounted on a car 4 which carries a welding equipment 7. It is to be realized that any suitable conventional welding equipment can be used. Each subframe 1 includes three elongated struts spaced from each other circumferentially, preferably at 120° from each other. Each strut 14 has at the end thereof a tread roller or idler 2 adapted to thrust against the internal surface of the pipe 5. All three struts 14 carrying the tread rollers 2 of each subframe are connected to a respective bearing bushing 11 which is mounted on an assigned shaft 10. Each subframe with its bearing bushing 11 is positioned concentrically with the axis of rotation of the pipe. The Subframes 1 are moveable along the shafts 10 in the axial direction of the pipe.

Thus, the axes of shafts 10 coincide with the axis of the pipe. The car 4 is positioned pivotably on the central axis and connected to both subframes 1 by the bearing bushings 11 so that the whole apparatus operates as a movable car.

The welding equipment is disposed on the car 4 so that it can be adjusted in length and height relative to the axes of the pipe. Each tread roller is provided with a locking device which includes a nut 12 rigidly connected to the strut 14, namely to the fork-like end portion thereof, and a locking bolt 13 adjustably mounted in the nut 12 and having a surface which can bear against the inner surface of the pipe. When the locking bolts 13 are screwed out from respective nuts 12, these bolts are pressed against the inner surface of pipe 5 whereby the respective subframe 1, in fact both of the them as well as the whole apparatus becomes locked at a selected point of pipe 5.

The equipment car 4 is provided at its one end with a transverse rod 8 extending outwardly therefrom. The rod 8 serves for fastening all supply lines which are necessary for welding and for protecting the supply lines against possible damages which may occur during the rotation of the pipe. The transverse rod 8 is positioned on a support 9 and has therefore no direct contact with the pipe 5.

The pipe 5 is brought into a rotary motion by a rotating mechanism 6 of any suitable conventional design. Due to the locking of bolts 13 on the inner surface of the pipe 5 the subframes 1 are rotating together with the pipe 5 whereas the equipment car 4 which is pivotally supported in the bearing bushings 11 remains in its hung vertical position. Upon rotation of the pipe 5 the motion between the pipe 5 and the welding equipment 7 as a so-called welding feed becomes effective. This motion results in complete welding of the internal circumferential welding seam upon a complete revolution of the pipe 5.

In order to use the above-described apparatus for the pipes of different diameters the struts 14 are provided with adjusting elements 3 which may be formed as sleeves from which the struts 14 can be telescopically expanded so that the length of struts 14 can be adjusted as well as the distance of the respective tread rollers to the inner surface of the pipe being treated.

The device is moveable in the longitudinal direction to a point where it is located against the circumferential weld to be produced. The subframes 1 and 2 are located at the front and rear ends of the device at two opposite ends of car 4. It is possible with the tread rollers 2 to move the subframes 1 centrally in the axial direction of the pipe and to lock rollers 2 by locking bolts 13 at predetermined points. The equipment car is pivotally arranged in the bearing bushings 11 in such a fashion that the car 4 is able to freely pivot or rotate about the central longitudinal axis of the pipe 5. Thereby the center of gravity of the car 4 lies below the central axis of the pipe; therefore the car is permanently hanging vertically downwards by its own dead weight. All equipment necessary for the welding is installed on the car 4. In order to control the welding process it is possible that the welding operator takes a seat in the car or in a separate car which can be provided in the apparatus. The apparatus is then driven into the pipe end locked as has been described herein above; afterwards the pipes to be welded are brought into rotary motion about their longitudinal axes by means 6. During this process both subframes are also rotating with the pipe, whereas the car 4 always remains in the vertical position due to its rotatable bearing and the arrangement or the center of gravity. The welding operation can now be carried out by the welding equipment mounted on the car 4 because the welding equipment is in the vertical position and in static condition, whereas the pipe is rotated. A welding method, for example submerged-arc welding can be used with the device according to the invention because the welding equipment is permanently hanging downward.

Due to the provision of the adjusting elements 3 the rollers 2 are adjustably arranged on the subframes so that the apparatus always remains in its central position within the pipe when all rollers 2 are uniformly adjusted. The current supply cables to the welding equipment are fastened to the transverse rod 8 which is mounted on the car. This rod 8 is supported outside the pipe in such a manner that it is freely located in the rotating pipe and does not contact it during the rotating of the same.

It will be understood that each of the elements described above, or two or more together, may also find a useful application in other types of devices for internal welding of pipes differing from the types described above.

While the invention has been illustrated and described as embodied in a device for internal welding of pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for internal welding of elongated objects, such as pipes, tanks or the like, particularly pipes of greater diameters and lengths, comprising means for rotating an object being welded about a central axes thereof; a car carrying welding equipment and positioned within an object to be welded; at least two subframes spaced from each other in the direction of elongation of said object and each carrying a plurality of tread rollers, said subframes being positioned within said object, said tread rollers being provided with locking means adapted to lock said tread rollers against an inner surface of said object; and at least one shaft arranged to be positioned along the central axis of the object and pivotally mounted in said subframes, said shaft being rigidly connected to said subframes so that upon rotation of said object about the central axis thereof said car is able to pivot freely about the central axis of the object and is permanently hung downwardly by its own weight, whereby a complete welding of an internal circumferential seam of said object is produced upon a complete rotation of the object by said rotating means.

2. The device as defined in claim 1, wherein said rotating means are positioned outside the object being welded.

3. The device as defined in claim 1, wherein each of said subframes carries at least three tread rollers.

4. The device as defined in claim 3, wherein each of said subframes includes three elongated struts each terminated with the respective tread roller, said struts being circumferentially spaced from each other at 120°.

5. The device as defined in claim 4, wherein each of said subframes further includes a bearing to which said three struts are rigidly connected, said shaft being pivotally mounted in the bearings of said subframes.

6. The device as defined in claim 5, wherein each of said struts is provided with an adjustable means for adjusting the length of said strut and thus the distance of the respective roller from said shaft to the inner surface of the object to be welded.

7. The device as defined in claim 6, wherein said locking means of each tread roller includes a nut rigidly connected to the respective strut and a locking bolt adjustably mounted in said nut and adapted to rest against the inner surface of said object.

8. The device as defined in claim 7, wherein said subframes are moveable along the elongation of the object to be welded.

9. The device as defined in claim 8, wherein said car is movable along the elongation of the object to be welded.

10. The device as defined in claim 9, wherein said car is provided with a transverse rod projecting outwardly from the object within which said car is positioned, and with a support, said transverse rod being supported on said support.

* * * * *